J. T. IRWIN.
HOT WIRE ELECTRICAL MEASURING INSTRUMENT.
APPLICATION FILED MAY 25, 1907.
964,521.
Patented July 19, 1910.
2 SHEETS—SHEET 1.
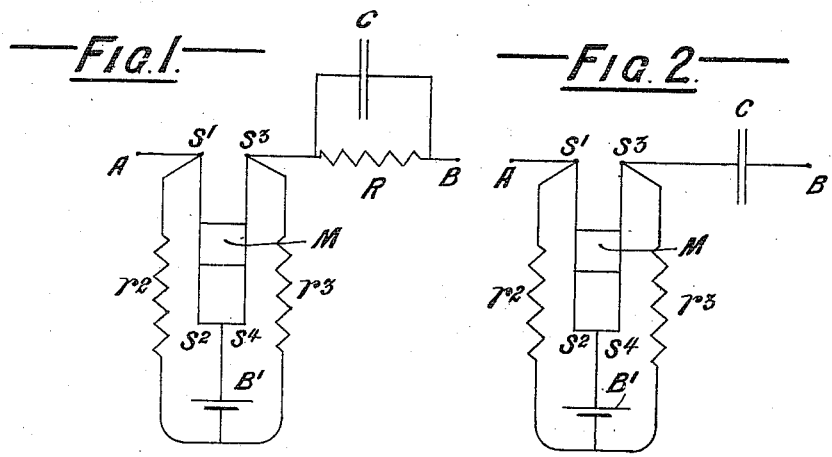
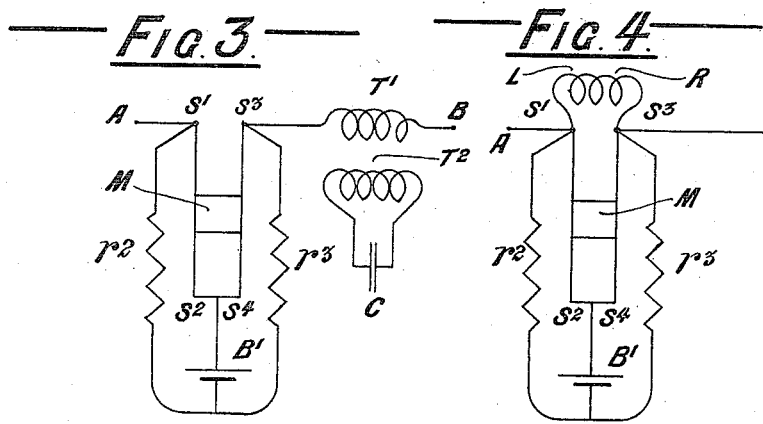
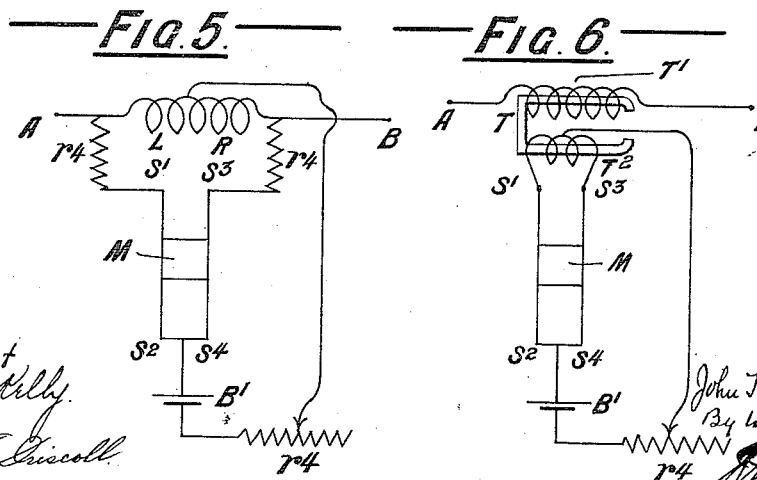

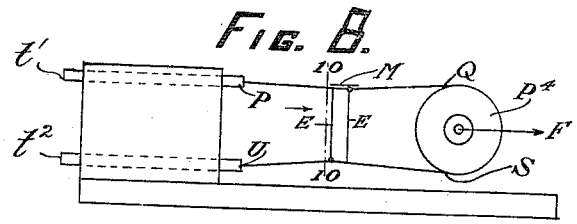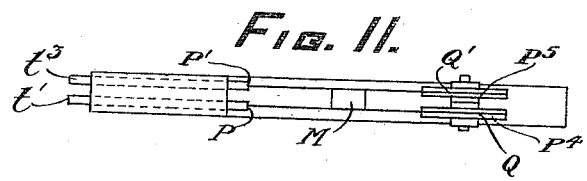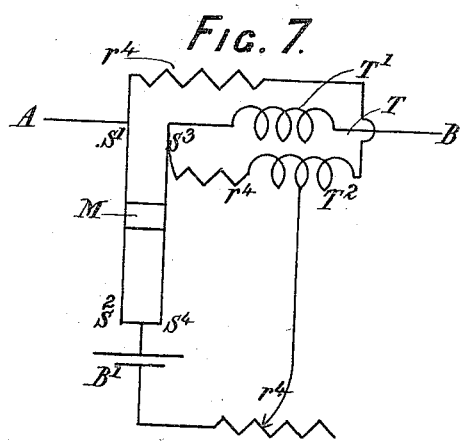

UNITED STATES PATENT OFFICE.

JOHN T. IRWIN, OF LONDON, ENGLAND.

HOT-WIRE ELECTRICAL MEASURING INSTRUMENT.

964,521.

Specification of Letters Patent.   Patented July 19, 1910.

Application filed May 25, 1907. Serial No. 375,589.

*To all whom it may concern:*

Be it known that I, JOHN THOMAS IRWIN, a subject of the King of Great Britain, and a resident of The Central Technical College, South Kensington, London, England, have invented a new and useful Improved Hot-Wire Electrical Measuring Instrument, of which the following is a specification.

My invention relates to electrical measuring apparatus on the hot wire principle, and consists in an imporved means for observing variations in the potential difference between two points or variations of the current flowing in a circuit or variations of the power given to a circuit. It is especially applicable in cases where the variation takes place very rapidly.

Heretofore it has been difficult to observe and measure accurately the instantaneous current or the variations of an electric current by means of the heating and cooling of wires and for three reasons:—(1) The deflection of a hot wire instrument is proportional practically to the square of the current passing through it. (2) The deflection is in the same direction no matter in what direction the current flows through the instrument. (3) Owing to the heat capacity of the strips or wires the instrument takes some time to attain its normal deflection after a given current is switched on; hence rapid variations cannot be observed.

Now according to my invention, I overcome objections (1) and (2) by polarizing the wires of the instrument from a continuous current supply when I wish to measure the instantaneous electric pressure or electric current. The effect of this is that; the current to be measured is either added to or subtracted from the polarizing continuous current and the deflection now becomes proportional to the current to be measured and not to the square of this current.

In order to overcome objection (3) I compensate for the heat capacity of the wires by employing condensers or inductive resistances, as described later, when measuring the instantaneous current, pressure or power.

For measuring the voltage or current, two wires or strips of about equal length and of the same material and resistance are joined together at one end. A source of constant continuous current is joined to the junction and a constant continuous current flows through the two wires or strips, half flowing through one wire or strip and half through the other. If another current from any other source is led through the two strips in series, the rate of heating in one wire will be equal to $(a-b)^2 r$ and in the other to $(a+b)^2 r$ and the difference in the rate of heating will equal $4abr$ where $b$ is the value of the constant continuous current in each strip, $a$ is the current sent through the two strips in series and $r$ the resistance of each strip; the rate of heating of each wire being proportional to the square of the current multiplied by the resistance. The difference in the heating of the two strips will produce a difference in the lengths of the two strips and this difference in length will be after a short time, proportional to $4abr$. Since $b$ and $r$ are practically constant the difference in the lengths of the two strips is proportional to $a$ the current sent through the two strips in series.

If there is an arrangement for observing the variation in length of the two strips one has a means of measuring the current $a$.

Some arrangements for carrying out my invention are shown diagrammatically in the accompanying drawings.

Figures 1, 2 and 3 show diagrammatically the arrangements I use when applying my invention for indicating the instantaneous voltage across two points in a circuit, say A B, while Figs. 4, 5, 6 and 7 show diagrammatically some arrangements for applying my invention to indicate the instantaneous current flowing in a circuit. Figs. 8 to 12 show details of an instrument embodying one form of the means for indicating the difference in expansion of the strips, and of these Fig. 8 is a side elevation, Fig. 9 is an end view from the right hand side of Fig. 8, Fig. 10 is a sectional view taken on the dotted line 10—10 of Fig. 8, Fig. 11 is a plan view of the instrument, and Fig. 12 is a diagrammatic perspective view showing the arrangement of the wires and tie cords.

In Fig. 1, $S^1$ $S^2$ and $S^3$ $S^4$ are two strips or wires made as nearly the same in every particular as possible, and each drawn back at the center with equal tension. $B^1$ is a source of continuous current, $r^2$ and $r^3$ are non-inductive resistances which are generally approximately equal. R is a non-inductive resistance placed in series with $S^1 S^2$ and $S^3 S^4$. C is a condenser placed in parallel with R.

If V is the instantaneous value of the voltage across A B and if the resistance of the strips $S^1 S^2$ and $S^3 S^4$ is small, the current flowing through the strips in series will be proportional to $$V + K\frac{dV}{dt}$$

where K equals a constant which must be determined by the heat capacity of the two strips and $$\frac{dV}{dt}$$

equals rate of increase of voltage: The value of K can be altered by altering the capacity of the condenser in parallel with R. There will be also a current in each strip equal to $b$ (say) from the source of continuous current $B^1$.

The difference in the rates of heating of the two strips will be proportional to $$\left(V + K\frac{dV}{dt}\right)$$

and the difference in temperature will be proportional to V if K is properly chosen.

To show how the action of a condenser compensates for the heat capacity of the strips, consider the arrangement in Fig. 1. If the resistance of the strips is low, the voltage across the condenser C and resistance R is very nearly equal at every instant to the voltage across A, B. If the resistance R is removed as in Fig. 2 there is only the current flowing into the condenser passing through the strips in series. This current is proportional to $$\frac{dV}{dt}$$

and produces a difference in the rates at which heat is being given to the two wires proportional to $$\frac{dV}{dt}.$$

In a short time $dt$ the difference in the quantities of heat given to the two strips=

$$H\frac{dV}{dt}dt = HdV$$

where H is a constant. The difference in the increases of temperature of the two wires in time $dt$ is proportional $HdV$ if the difference in the rates at which heat is being lost by the wires is very small. Therefore in this particular case the increase of the difference in temperature is proportional to the increase in voltage across A, B. Now the difference in the rates of losing heat at any instant of the two wires is proportional to their difference in temperature and if this difference is appreciable it will have to be compensated for by putting the resistance R across the condenser C when in addition to a current proportional to $$\frac{dV}{dt}$$

there is a current proportional to V flowing through strips. This current is arranged to produce a difference in the rates of heating of the two wires equal to the rate at which one wire is losing heat faster than the other. In this case, the only change in difference of temperature of the two wires is produced by the condenser current and is proportional to the change of voltage. Therefore we have the general result that if we require to measure the instantaneous value of any quantity by means of a hot wire instrument the difference in the rates at which heat is given to the wires must be proportional to the quantity plus the rate at which the quantity is varying. To measure the instantaneous voltage the current through the strips must be proportional to $$V + K\frac{dV}{dt}.$$

To measure the instantaneous current in a circuit the current must be proportional to $$C + K_5\frac{dC}{dt}.$$

To measure the instantaneous watts or power the difference in the rates of heating must be proportional to $$CV + K_6\frac{d(CV)}{dt} = CV + K_6 V\frac{dC}{dt} + K_6 C\frac{dV}{dt}.$$

Fig. 2 shows the arrangement I prefer to employ where the frequency is high; I here dispense with the resistance R and place the strips in series with C alone. The reason that R can be dispensed with is that the current through the resistance R will be very small compared with that flowing into the condenser when the frequency is high and therefore is relatively negligible. In this case, however, if the rate of cooling of the strips is known it is easy to calculate from the observed deflection what the deflection would have been if the resistance R had been across the condenser, since the difference in the heat lost is any time $t$ is proportional to $$\int_0^t T dt$$

where T is the instantaneous value of the temperature difference of the two wires. It is especially useful to be able to dispense with the resistance R when the voltage across A B is high since the cost of resistances for high voltages is very great.

Fig 3 shows the arrangement I use if the voltage across A B is small: Here $T^1$ is the primary of a transformer placed in the main circuit in series with $S^1$, $S^2$, $S^3$, $S^4$ and $T^2$ the secondary, and C is a condenser across the secondary. This enables me to use a smaller condenser if the voltage on the secondary of the transformer is made higher than that on the primary. Turning to the arrangements shown in Figs. 4, 5, 6 and 7 for applying my invention to indicate the instantaneous current flowing in a circuit, it is required to insure that the difference in the temperature of the two strips will be practically proportional to the instantaneous current flowing in a circuit of which A B is a part. To insure this, the current through the strips $S^1$ $S^2$ and $S^3$ $S^4$ in series must be proportional to $$C + K_5 \frac{dC}{dt}$$

where C is the instantaneous current in A B, $$\frac{dC}{dt}$$

equals the rate of increase of current and $K_5$ is a constant depending on the heat capacity of the strips.

Fig. 4 shows the arrangement I prefer to use if the current in A B is large compared with the current to be carried by the strips. In this arrangement, a coil of self induction L and resistance R is placed in the circuit and the instrument shunted across it. In this case I get an instantaneous voltage across and therefore an instantaneous current through the strips in series proportional to $$CR + L\frac{dC}{dt}$$

which is proportional to $$C + K_5 \frac{dC}{dt},$$

since R and L are constant and I chose R and L as explained above with reference to Fig. 1 so that the difference of temperature of the strips at every instant will be proportional to the instantaneous current in A B.

Fig. 5 shows an alternative arrangement which I use to diminish the number of non-inductive resistances shunting the inductive coil; here one pole of the source of continuous current is connected to the middle of the inductive coil and the other pole to the junction of the strips resistances $r^4$ being inserted as shown to regulate the current carried by the strips.

Fig. 6 shows the arrangement which I use when the frequency is high since in this case the resistance drop across the transformer is very small compared with the inductive drop. I also use it in cases where the rate of cooling of the strips is known and can be allowed for. Here T is a transformer constructed so that the flux is practically proportional to the ampere turns. The primary $T^1$ is inserted in the main circuit and the secondary $T^2$ is placed across the two strips in series. I arrange so that the ampere turns on the secondary $T^2$ are very small compared with the ampere turns on the primary. One pole of the source of continuous current is connected to the middle of the secondary $T^2$ and the other pole to the junction of the strips, a resistance $r^4$ being inserted to regulate the current carried by the strips.

In Fig. 7 is shown an arrangement which I use when the current is small and it is desired to obtain a curve which will show the instantaneous values of the currents without any correction. The arrangement is the same as in Fig. 6, except that the primary $T^1$ is here inserted in the main circuit in series with the two strips so that a current proportional to the main current now flows through the strips in series in addition to a current proportional to the rate of change of the main current. Resistances $r^4$ are inserted as shown to regulate the current carried by the strips.

In Figs. 1 to 7, M represents a mirror for indicating the difference in the expansion of the two strips.

Figs. 8 to 12 show the instruments which I use for making the measurements obtained by the arrangements described with reference to Figs. 1 to 7. The terminals are $t^1$ $t^2$ $t^3$ $t^4$. The wire PQSU which corresponds to the wire or strip $S^1$ $S^2$ in the diagrammatic arrangements of Figs. 1 to 7, instead of being nearly straight and only drawn back at the middle point, passes over a pulley $P^4$ and returns nearly parallel to itself as shown in Fig. 8. A similar wire P'Q'S'U' passes over the pulley $P^5$ and returns in a similar manner. This wire P'Q'S'U' corresponds to the wire or strip $S^3$ $S^4$ in Figs. 1 to 7. The wire PQ is tied at about its middle point to the middle point of the wire U'S' and the wire US is tied in a similar manner to the wire P'Q' as shown in Fig. 10 and Fig. 11 where the wires complete with their tie cords EE are shown. The tie cords are in tension. The pulleys $P^4$ $P^5$ are drawn in the direction F with a nearly constant force. A mirror M is placed across the two wires PQ and P'Q' near their middle points and will be tilted an amount practically proportional to the difference in the temperatures of the two strips PQSU and P'Q'S'U'.

The mirror is made very light when the instrument is required to measure instantaneous values.

The terminals $t^2$ and $t^4$ are generally joined together to form the common point of the two wires or strips. The tie cords EE are of course non-conducting or else insulated from the strips.

I do not limit myself to the above arrangements of the instruments which illustrate the manner in which I carry out my invention, nor do I limit myself to the construction of the instrument shown in Figs. 8 to 12, but only to the principle where the wires return on themselves and are tied and connected among themselves as shown in the figures.

I may sometimes mount a number of instruments together so as to show at one time, say, the instantaneous values of the current voltage and power.

What I claim as my invention and desire to secure by Letters Patent is:—

1. An electrical hot wire measuring instrument comprising two strips or wires connected together at one end, two nearly equal resistances respectively connected to the free ends of the two strips or wires, a source of continuous current one pole of which is connected to the united ends of the two strips and the other pole connected to the two nearly equal resistances in parallel, a non-inductive resistance in the main circuit and in series with the two strips, a condenser in parallel with this resistance, and means for indicating the difference in expansion of the two strips on the passing of a current through the strips in series.

2. An electrical hot wire measuring instrument comprising two strips connected together at one end, two nearly equal resistances respectively connected to the free ends of the two strips or wires, a source of continuous current one pole of which is connected to the united ends of the two strips and the other pole connected to the two nearly equal resistances in parallel, a main circuit, a condenser in the main circuit in series with the strips, and means for indicating the difference in expansion of the two strips on the passing of a current from the main circuit through the strips in series.

In testimony, that I claim the foregoing as my invention, I have signed my name in presence of two witnesses, this 8th day of May 1907.

J. T. IRWIN.

Witnesses:
  G. W. O. Howe,
  W. E. Robson.